No. 682,511. Patented Sept. 10, 1901.
J. R. WEATHERLY.
STALK CUTTER.
(Application filed June 8, 1901.)
(No Model.) 2 Sheets—Sheet 1.
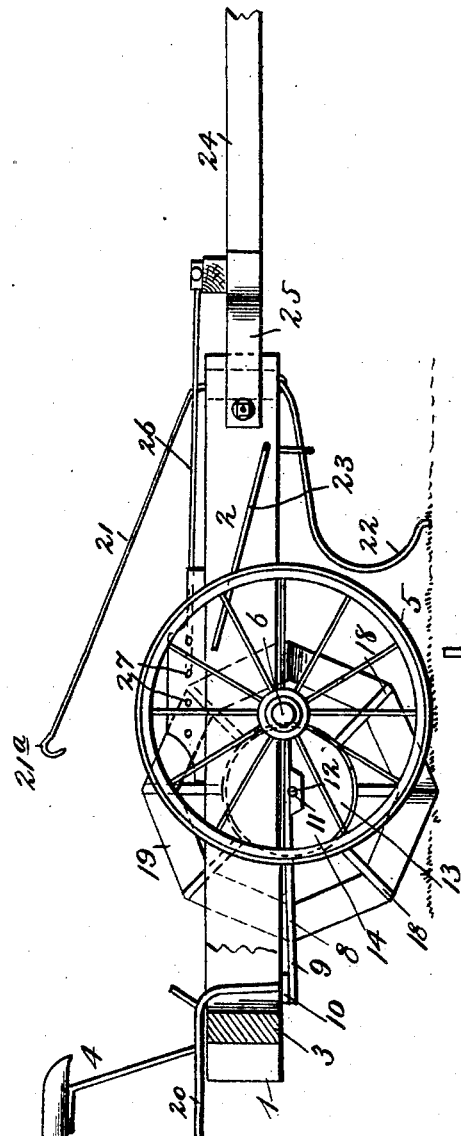
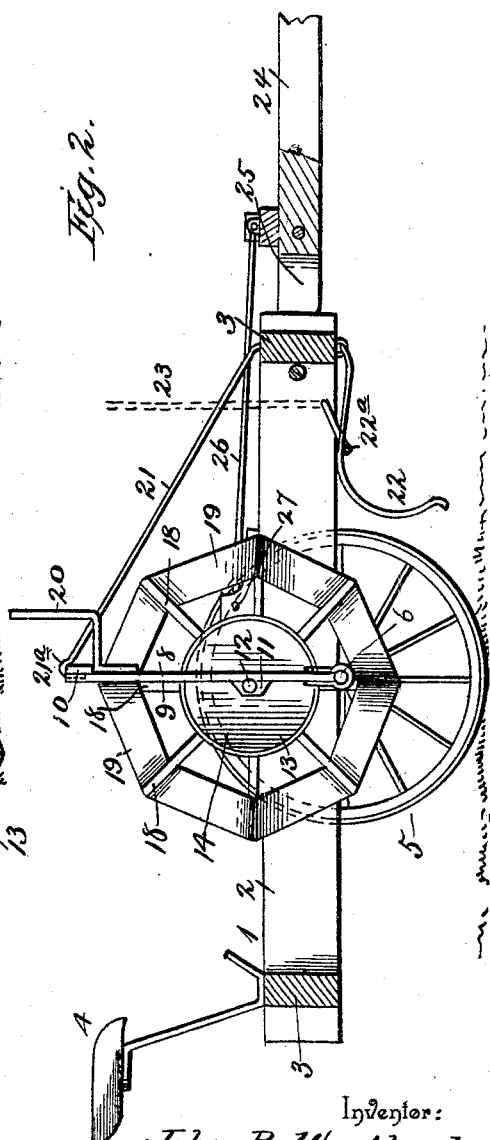
Witnesses
F. L. Ourand
F. G. Radelfinger
Inventor:
John R. Weatherly,
by Louis Bagger & Co.,
Attorneys.

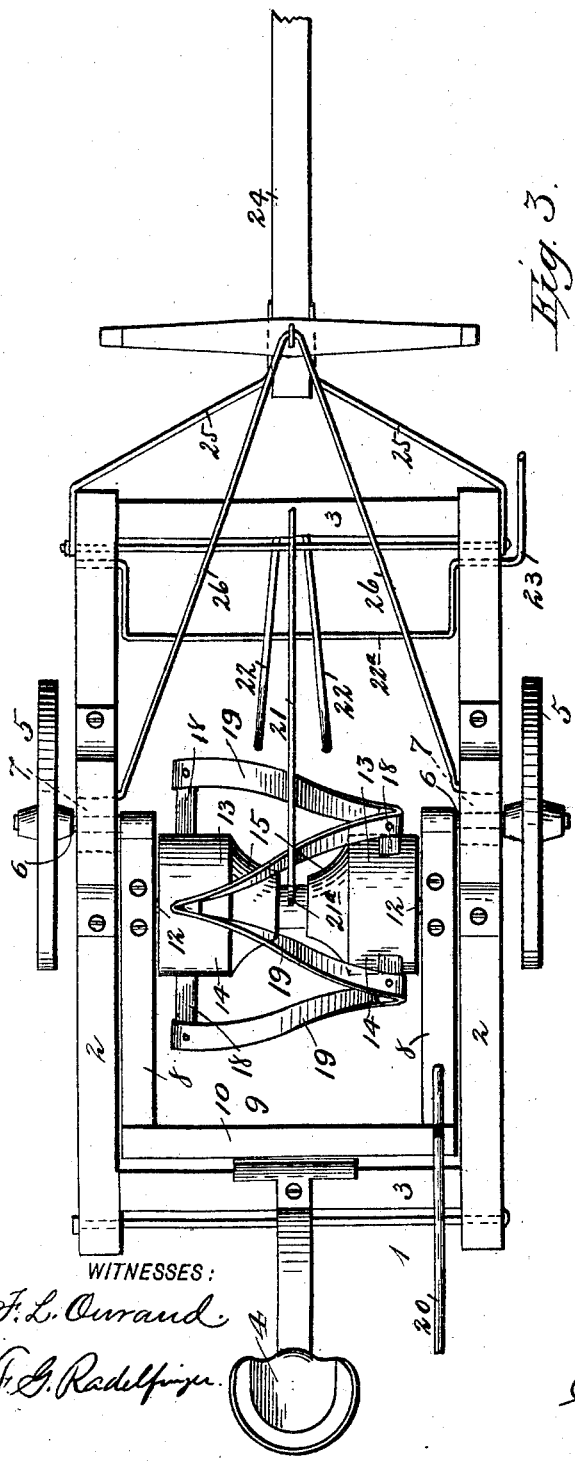

UNITED STATES PATENT OFFICE.

JOHN R. WEATHERLY, OF SUMTER, SOUTH CAROLINA.

STALK-CUTTER.

SPECIFICATION forming part of Letters Patent No. 682,511, dated September 10, 1901.

Application filed June 8, 1901. Serial No. 63,791. (No model.)

*To all whom it may concern:*

Be it known that I, JOHN R. WEATHERLY, a citizen of the United States, residing at Sumter, in the county of Sumter and State of South Carolina, have invented new and useful Improvements in Stalk-Cutters, of which the following is a specification.

My invention relates to stalk-cutters, and is in the nature of an improvement on the machine for which Letters Patent No. 610,114 were granted me.

The object of my invention is to provide a machine the knife-drum of which shall be actuated by engaging with the ground and may be driven astride of the rows of old stalks without wabbling. My machine is also provided with a vertical adjustment of the knives, which permits them to be raised up when not in use.

All of the foregoing advantages are attained by the simple and novel construction described in this specification and claimed and illustrated in the accompanying drawings, forming a part thereof, in which—

Figure 1 is a side elevation of the machine with knife-drum lowered. Fig. 2 is a similar view with drum raised. Fig. 3 is a plan view of the same. Fig. 4 is a perspective of the knife-drum.

Like numerals of reference designate like parts in the different views of the drawings.

The numeral 1 designates the frame of my machine, comprising side bars 2 and transverse end bars 3. A seat 4 is supported on the rear bar 3. The frame 1 is mounted on two wheels 5, which turn on stub-axles 6, supported in boxes bolted to the side bars 2. Keyed to the inner ends of the axles 6 are the arms 8 of a yoke 9, the cross-bar of which is designated by the numeral 10. Journaled in the arms 8 in boxes 11 is a shaft 12, on which is mounted the knife-drum 13 of my cutter. The drum 13 comprises two hubs 14, beveled off or coned on their inner ends at 15 to deflect the stalks. Depending from the shafts 12, intermediate of the hubs 14, is a T-shaped guard 16, having oppositely-extending arms 17, which prevent the accumulation of stalks within the drum. On the periphery of the hubs 14 are mounted a series of radial arms 18, which are arranged alternately to divide the intervals. These alternate arms 18 are connected by knife-blades 19, rigidly secured thereto with their edges all lying in the surface of a cylinder, the axis of which is coincident with that of the shaft 12. This arrangement of the knives gives a shearing cut and also a wabbling motion of the machine when driven on level ground with the drum 13 down. An arm 20 is secured to the yoke 9 and serves to limit the movement of the drum 13 by resting on the rear end of bar 3 and as a means for raising and lowering it. An arm 21 is secured to the front bar 3 and provided with a hook 21$^a$ on its outer end positioned to engage the cross-bar 10 of the yoke 9 when the drum is raised, as shown in Fig. 2. Curved diverging rake-teeth 22 are pivoted to the forward bar 2 and serve to straighten the stalks lying crosswise the path of the machine. An adjustable guard, comprising a yoke 22$^a$, pivoted to the side bars 2, and a lever-arm 23, integral with the yoke, is designed to bend over the stalks to a position close to the ground in position to be engaged by the knives. A tongue 24 is pivoted to the frame 1 by hounds 25 and braces 26, which are pivoted to the tongue 24 and each hooked into one of a series of apertures 27 in the frame, which enables the tongue to be set at any height desired and hold the machine steady.

In operation my machine is driven astride of one of the rows of old stalks, which lie in ridges about one foot in height. These knives 19 will engage with the row about the middle, thereby keeping the knives off of the ground, except perhaps the V-shaped ends 19$^a$. In going into the field the drum 13 is lowered down with the arm 20 in contact with the bar 3 and the guard-yoke 22$^a$ also lowered. On leaving the field the drum 13 is raised into the position shown in Fig. 2.

I do not wish to be limited as to details of construction, as these may be modified in many particulars without departing from the spirit of my invention.

Having thus described my invention, what I claim as new, and wish to secure by Letters Patent, is—

1. In a device of the class described, a knife-drum comprising the combination of two hubs coned on their inner ends, radial arms arranged alternately mounted on said hubs, and knives connecting said arms in pairs and extending diagonally of the drum.

2. In a device of the class described, a knife-drum comprising the combination of two hubs, radial arms mounted on said hubs and arranged alternately, and knives connecting said arms, substantially as described.

In testimony whereof I have hereunto set my hand in presence of two subscribing witnesses.

JOHN R. WEATHERLY.

Witnesses:
I. C. STRAUSS,
C. E. STUBBS.